US011679417B2

(12) United States Patent
Breysse et al.

(10) Patent No.: US 11,679,417 B2
(45) Date of Patent: Jun. 20, 2023

(54) EQUIPMENT FOR FEEDING A SORTING CONVEYOR WITH PARCELS IN AN AUTOMATED MANNER

(71) Applicant: SOLYSTIC, Bagneux (FR)

(72) Inventors: Steve Breysse, Saint Georges les Bains (FR); Olivier Roch, Saint Georges les Bains (FR); Richard Blache, Lemps (FR); Bruno Stuner, Paris (FR)

(73) Assignee: SOLYSTIC, Bagneux (FR)

( * ) Notice: Subject to any disclaimer, the term of this patent is extended or adjusted under 35 U.S.C. 154(b) by 27 days.

(21) Appl. No.: 17/478,085

(22) Filed: Sep. 17, 2021

(65) Prior Publication Data
US 2022/0111420 A1    Apr. 14, 2022

(30) Foreign Application Priority Data
Oct. 13, 2020 (FR) ...................... 2010452

(51) Int. Cl.
*B07C 1/04* (2006.01)
*G06V 20/10* (2022.01)
(Continued)

(52) U.S. Cl.
CPC ............... *B07C 1/04* (2013.01); *B07C 3/008* (2013.01); *B07C 3/14* (2013.01); *B25J 9/1669* (2013.01);
(Continued)

(58) Field of Classification Search
CPC ........ B25J 9/1669; B25J 9/1697; B25J 13/08; B25J 15/0616; B65G 47/1478;
(Continued)

(56) References Cited

U.S. PATENT DOCUMENTS 9,333,649 B1 * 5/2016 Bradski ................. G06T 19/003
9,676,003 B2 * 6/2017 Kara ..................... B65G 47/967
(Continued)

FOREIGN PATENT DOCUMENTS

CN          106694385 A    5/2017
WO       2016/128637 A1   8/2016
(Continued)

OTHER PUBLICATIONS

French Search Report dated Jun. 15, 2021 issued by INPI from corresponding Application No. FR 2010452, 2 pages.

*Primary Examiner* — Joseph C Rodriguez
(74) *Attorney, Agent, or Firm* — Ware, Fressola, Maguire & Barber LLP

(57) ABSTRACT

An equipment for automatically feeding parcels to a sorting conveyor, the equipment having a platform for temporarily storing a pile of parcels arranged loosely, a first vision system designed to form a digital image of the loose pile of parcels while the pile is stationary on the platform, a processor unit having setting data for responding to the digital image by identifying a parcel for singulating that presents a grip face that is not covered by another parcel, and by supplying indicative data about the three-dimensional position, the orientation in three dimensions, and the dimensions of the grip face, and a pneumatic gripper head of a robotic arm that is controlled on the basis of the data so as to take hold of the parcel for singulating by its grip face.

10 Claims, 2 Drawing Sheets

(51) Int. Cl.
  *B07C 3/00* (2006.01)
  *B07C 3/14* (2006.01)
  *B25J 9/16* (2006.01)
  *B25J 13/08* (2006.01)
  *B65G 47/248* (2006.01)
  *B25J 15/06* (2006.01)
  *H04N 23/90* (2023.01)

(52) U.S. Cl.
  CPC .............. *B25J 9/1697* (2013.01); *B25J 13/08* (2013.01); *B65G 47/248* (2013.01); *G06V 20/10* (2022.01); *B25J 15/0616* (2013.01); *H04N 23/90* (2023.01)

(58) Field of Classification Search
  CPC .............. B65G 47/1485; B65G 47/248; B65G 2203/0225; B65G 2203/041; B07C 1/02; B07C 1/025; B07C 1/04; B07C 1/06; B07C 3/008; B07C 3/14
  See application file for complete search history.

(56) References Cited

U.S. PATENT DOCUMENTS

| | | | |
|---|---|---|---|
| 9,707,682 B1* | 7/2017 | Konolige | B25J 9/162 |
| 2016/0263622 A1* | 9/2016 | El Bernoussi | B25J 9/1687 |
| 2018/0056333 A1* | 3/2018 | Hicham | B07C 1/04 |
| 2018/0345324 A1* | 12/2018 | Hillerich, Jr. | B07C 5/3422 |
| 2019/0344974 A1* | 11/2019 | Wicks | B65G 47/914 |

FOREIGN PATENT DOCUMENTS

| | | |
|---|---|---|
| WO | 2019/159411 A1 | 8/2019 |
| WO | 2020/093902 A1 | 5/2020 |

* cited by examiner

EQUIPMENT FOR FEEDING A SORTING CONVEYOR WITH PARCELS IN AN AUTOMATED MANNER

CROSS REFERENCE TO RELATED APPLICATION

This application claims priority under 35 USC § 119 to French Patent Application No. 20 10452 filed on Oct. 13, 2020, which is hereby incorporated by reference in its entirety.

TECHNICAL FIELD

The invention relates to equipment for automatically feeding parcels to a sorting conveyor.

PRIOR ART

Nowadays, logistics platforms include equipment designed to feed sorting conveyors with heterogeneous parcels in automatic manner.

Such equipment generally comprises a robotic arm serving to separate and singulate parcels stored loosely on a platform and to place them in series on a sorting conveyor, as disclosed in document WO2016/128637.

In order to sort the parcels to appropriate sorting outlets, the sorting conveyor has sensors adapted to detect respective sorting indications on the tops of the parcels.

However, a sorting indication is generally applied on only one of the faces of a parcel, which face is not necessarily facing the sensors of the sorting conveyor.

Operators thus turn over the parcels manually on the sorting conveyor so that the sorting indications are presented facing the sensors.

That manual operation constitutes a task that is tedious and not ergonomic for the operators.

SUMMARY OF THE INVENTION

An object of the present invention is is to provide equipment for automatically feeding a sorting conveyor with parcels that contributes to solving the above-mentioned problems.

For this purpose, the invention provides equipment for automatically feeding parcels to a sorting conveyor, the equipment comprising a platform for temporarily storing a pile of parcels arranged loosely, a first vision system designed to form a digital image of the loose pile of parcels while it is stationary on the platform, a processor unit having setting data for responding to the digital image by identifying a parcel for singulating that presents a grip face that is not covered by another parcel, and by supplying indicative data about the three-dimensional position, the orientation in three dimensions, and the dimensions of the grip face, and a pneumatic gripper head of a robotic arm that is controlled on the basis of said data so as to take hold of the parcel for singulating by its grip face, said equipment including a parcel positioning device designed to turn a parcel over through 180° relative to its orientation of the platform, and a second vision system arranged on the robotic arm and designed to form a digital image of the grip face of the parcel for singulating on the platform, said data processor unit having setting data for responding to said digital image by controlling the robotic arm either to place the parcel on the sorting conveyor in response to sorting information being identified or else to place the parcel on the positioning device in response to sorting data not being identified, in that the second vision system is designed to take a digital image of the grip face of the parcel turned over through 180° on the positioning device, said data processor unit having setting data for responding to this digital image by controlling the robotic arm either to place the parcel on the sorting conveyor in response to sorting information being identified or else to place the parcel in a reject container in response to sorting data not being identified, and in that the turnover device comprises a parcel receiver support mounted to pivot through 180° and a parcel discharge support facing the receiver support, said receiver support having a plurality of suction cups designed to hold the parcel against the receiver support while it is being pivoted through 180°.

The equipment of the invention may advantageously present the following characteristics:

the platform includes a parcel discharge conveyor for discharging to the reject container, the processor unit having settings for responding to the digital image of the pile of parcels by identifying parcels that are out of format and, when all of parcels remaining on the platform are parcels that are out of format, for responding by controlling the discharge conveyor so as to discharge the parcels into the reject container.

The idea on which the invention is based is to use a completely automatic system that is capable of feeding a sorting conveyor with parcels, of separating and singulating the parcels, and of orienting the parcels with the face of each parcel that has the sorting indication facing upwards.

More particularly, the idea consists in using a parcel turnover device and a vision system that are interposed between the parcel storage platform and the sorting conveyor so that it is possible to perform prior sorting of parcels that are out of format or that are specific.

BRIEF DESCRIPTION OF THE DRAWINGS

The present invention can be better understood, and other advantages appear on reading the detailed description of an embodiment taken by way of non-limiting example and illustrated by the accompanying drawings, in which.

DETAILED DESCRIPTION OF THE INVENTION

Figure 1:
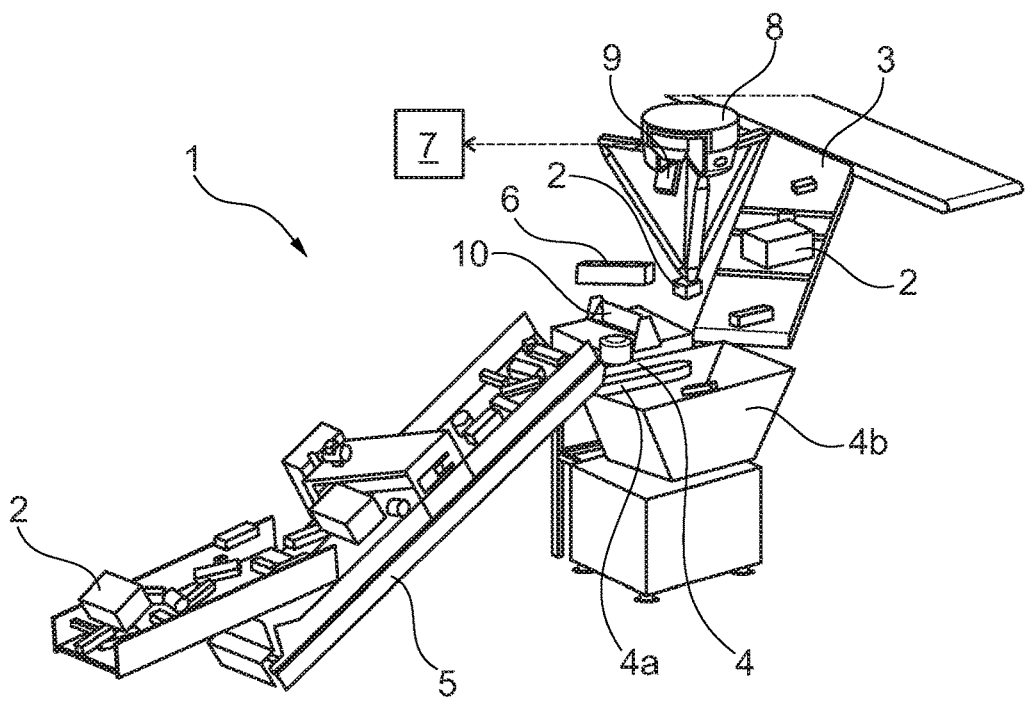
FIG. 1 is a diagrammatic view of equipment of the invention for automatically feeding parcels to a sorting conveyor.

FIG. 1 shows equipment 1 of the invention for automatically feeding parcels to a sorting conveyor 3, which equipment is particularly well adapted to handling parcels 2 of the "two-sided" type with various different typological types mixed together in a single stream.

The term "typological types" is used to cover parcels 2 of the Polybag type with wrapping of plastics material or of cardboard.

Figure 2:
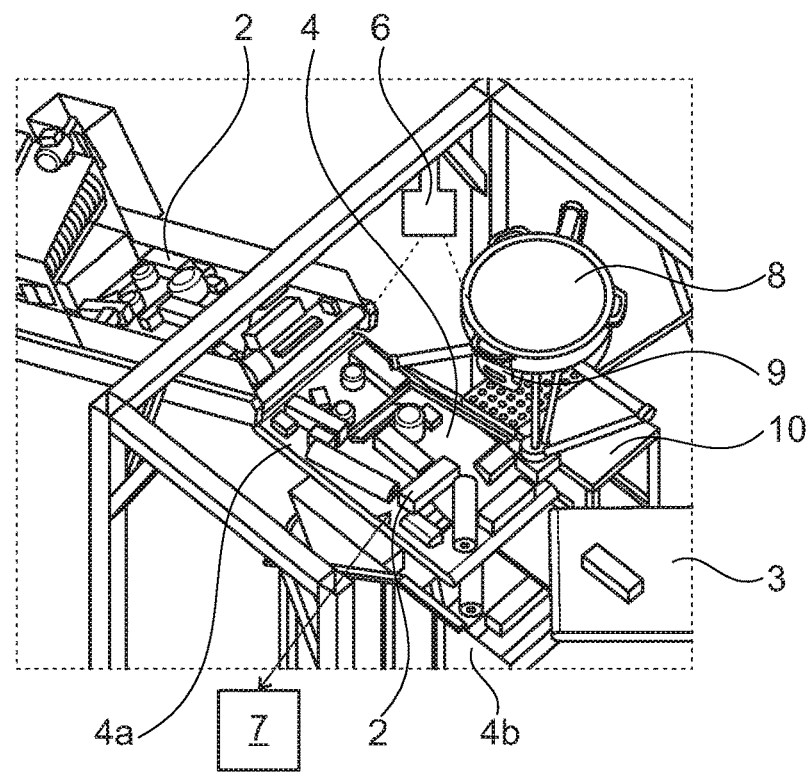
FIG. 2 is a diagrammatic plan view of a portion of the equipment of the invention for automatically feeding parcels to a sorting conveyor.

In this example, the equipment 1 includes a platform 4 for temporarily storing a pile of loosely arranged parcels 2, and specifically, as shown in FIG. 2, an automatic discharge conveyor 4a for discharging parcels 2 into a reject container 4b.

An unpiler device 5 may also be provided upstream of the discharge conveyor 4a in order to obtain a better distribution of parcels 2 on the platform 4.

The equipment 1 also includes a first vision system 6 designed to form a digital image of the loose pile of parcels 2 when stationary on the platform 4.

From the digital image taken by the first vision system 6, a data processor unit 7 identifies a parcel 2 for singulating, which parcel presents a grip face that is not covered by another parcel 2, and in return supplies indicative data such as the three-dimensional position, the orientation in three dimensions, and the dimensions of the grip face of the parcel 2 for singulating.

From the digital image of the pile of parcels 2, the processor unit 7 also identifies whether all of parcels 2 remaining on the platform are parcels that are out of format (i.e. of large size and/or of complex shapes) or that are specific (such as pharmaceutical parcels that are identifiable with a logo), and in response controls the discharge conveyor 4a so that it discharges those parcels 2 into the reject container 4b.

The equipment 1 further includes a robotic arm 8 provided with a pneumatic gripper head controlled by the processor unit to take hold of the parcel 2 for singulating by its grip face.

In this example, the pneumatic gripper head includes suction cups that are controlled individually by the processor unit 7 as a function of the indicative data about the three-dimensional position, the orientation in three dimensions, and the dimensions of the grip face.

Figure 3:
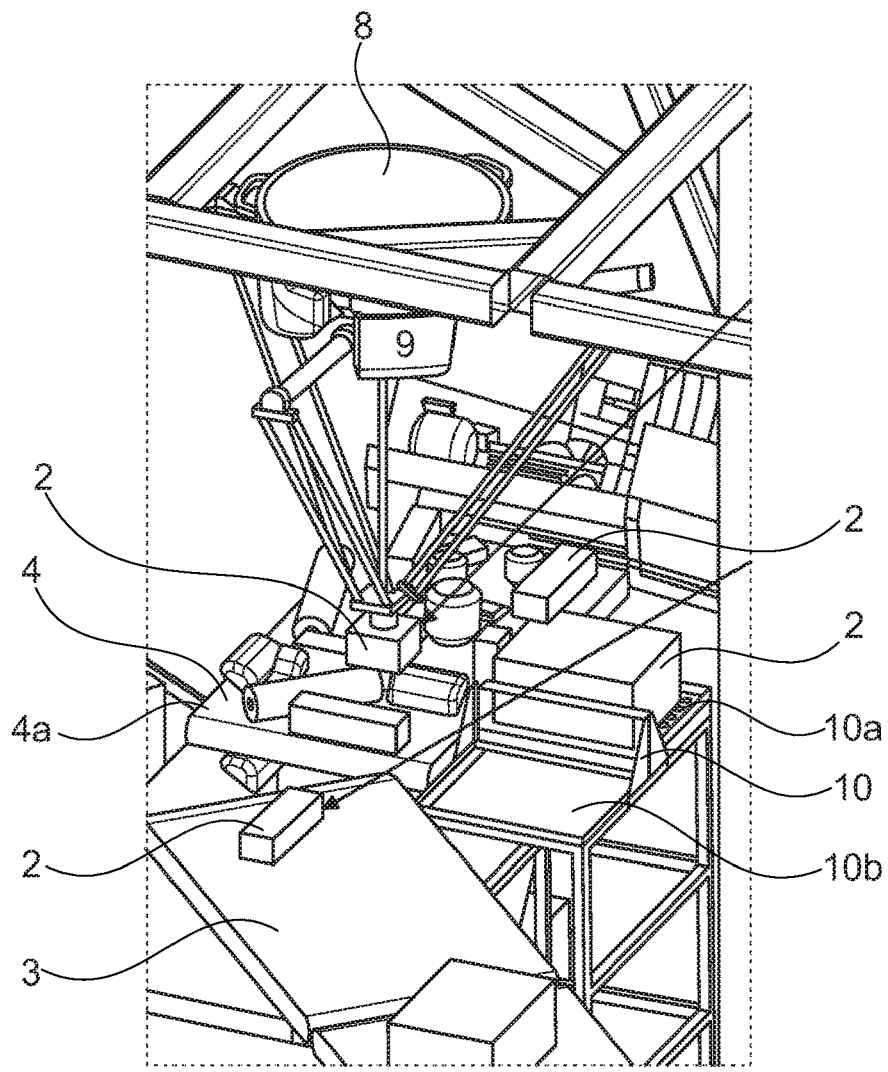
FIG. 3 is a diagrammatic close-up view of the positioning device of the invention.

The robotic arm 8 is thus designed to take a parcel 2 from the platform 4 and to place it with its faces in the same orientation on the sorting conveyor 3, as shown in FIG. 3.

However, the absence of any sorting indication on the grip face would prevent the parcel 2 from being sorted subsequently by the sorting conveyor 3.

Thus, prior to the robotic arm 8 taking hold of the parcel 2, it is verified whether a sorting indication is present on the grip face of the parcel 2 for singulating.

For this purpose, the equipment 1 includes a second vision system 9 arranged on the robotic arm 8 and designed to form a digital image of the grip face of the parcel 2 for singulating while it is on the platform 4.

Thus, in response to identifying sorting information on the grip face of the parcel 2 for singulating, the data processor unit 7 controls the robotic arm 8 so that it places the parcel 2 on the sorting conveyor 3.

In contrast, in response to not identifying a sorting indication, the equipment 1 includes a parcel positioning device 10 designed to turn the parcel 2 over through 180° so as to present the face of the parcel that is opposite from the face of the parcel that constituted its grip face while it was stored on the platform 4.

More particularly, the positioning device 10 has a receiver support 10a for receiving the parcel 2 and that is mounted to pivot through 180°, and a discharge support 10b for discharging the parcel 2 and facing the receiver support 10a, said receiver support 10a having a plurality of suction cups 10c designed to hold the parcel 2 against the receiver support 10a while it is pivoting through 180°.

Figure 4:
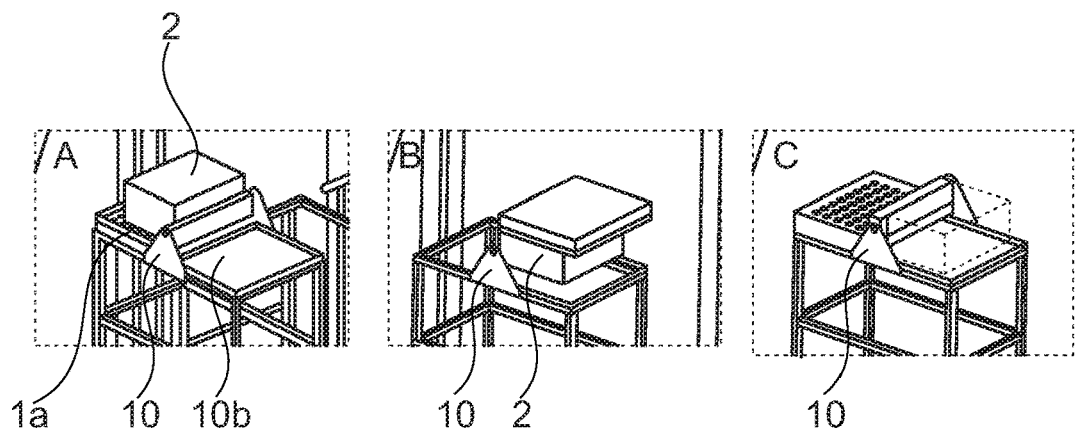
FIG. 4 is a diagrammatic view of the dynamics of turning over a parcel with the turnover device of the invention.

FIG. 4 shows specifically the dynamics of turning over a parcel using the turnover device 10, at A the parcel 2 is placed on the receiver support 10a, at B the receiver support 10a is pivoted through 180° together with the parcel 2, and at C the receiver support releases the parcel 2 (by stopping suction), pivots through 180° in order to receive another parcel, and allows the parcel stored on the discharge support 10b to be picked up by the robotic arm 8.

In this example, the parcel 2 is turned through 180° as soon as it is received, i.e. the turning is automatic, whereas the actions of the robotic arm 8 are all controlled by the processor unit 7.

The second vision system 9 then takes a new digital image of the parcel 2 after it has been turned through 180° on the positioning device 10 in order to verify whether a sorting indication is present on the new grip face of the parcel 2.

Thus, in response to identifying sorting information on the new grip face, the data processor unit 7 controls the robotic arm 8 so that it places the parcel 2 on the sorting conveyor 3.

In contrast, in response to not identifying a sorting indication, the processor unit 7 controls the robotic arm 8 to place the parcel in the reject container 4b.

In advantageous manner, the processor unit 7 is provided with settings for controlling the travel speed and the acceleration of the robotic arm 8 as a function of the type of the parcel 2 as detected by the first vision system 6.

More particularly, in this example the processor unit 7 is designed to increase the travel speed of the robotic arm 8 and to increase the suction of the suction cups for small cardboard parcels and to decrease the travel speed for large parcels of the Polybag type.

The invention claimed is:

1. An equipment for automatically feeding parcels to a sorting conveyor, the equipment comprising a platform for temporarily storing a pile of parcels arranged loosely, a first vision system designed to form a digital image of the loose pile of parcels while the pile is stationary on the platform, a processor unit having setting data for responding to the digital image by identifying a parcel for singulating that presents a grip face that is not covered by another parcel, and by supplying indicative data about the three-dimensional position, the orientation in three dimensions, and the dimensions of the grip face, and a pneumatic gripper head of a robotic arm that is controlled on the basis of said data so as to take hold of the parcel for singulating by the grip face of the parcel, said equipment including a parcel positioning device designed to turn a parcel over through 180° relative to its orientation of the platform, and a second vision system arranged on the robotic arm and designed to form a digital image of the grip face of the parcel for singulating on the platform, said data processor unit having setting data for responding to said digital image of the grip face of the parcel by controlling the robotic arm either to place the parcel on the sorting conveyor in response to sorting information being identified or else to place the parcel on the parcel positioning device in response to sorting data not being identified, in that the second vision system is designed to take a digital image of the grip face of the parcel turned over through 180° on the parcel positioning device, said data processor unit having setting data for responding to this digital image of the grip face of the parcel taken by the second vision system by controlling the robotic arm either to place the parcel on the sorting conveyor in response to sorting information being identified or else to place the parcel in a reject container in response to sorting data not being identified, and in that the parcel positioning device comprises a parcel receiver support having a first position in which the receiver support is configured to receive a parcel placed by the robotic arm, said receiver support having a second position in which the receiver support is pivoted through 180° with the parcel, said parcel positioning device comprising a parcel discharge support facing the receiver support, when the receiver support has pivoted through 180° with the parcel in the second position, said receiver support having a plurality of suction cups designed to hold the parcel against the receiver support while the parcel is being pivoted through 180° and to release said parcel on the discharge support when the receiver support is facing said discharge support in the second position, said receiver support designed to pivot through 180° in the first position when the parcel has been released on the discharge support and to allow the reception of another parcel, said robotic arm being controlled to pick up the parcel on the discharge support.

2. The equipment for automatically feeding parcels to a sorting conveyor according to the claim 1, wherein the platform includes a parcel discharge conveyor for discharging to the reject container, and wherein the processor unit has settings for responding to the digital image of the pile of parcels by identifying parcels that are out of format and, when all of parcels remaining on the platform are parcels that are out of format, for controlling the discharge conveyor so as to discharge the parcels into the reject container.

3. The equipment for automatically feeding parcels to a sorting conveyor according to claim 2, wherein the turning is automatic as soon as a parcel is received.

4. The equipment for automatically feeding parcels to a sorting conveyor according to claim 3, wherein the processor unit is provided with a setting for controlling the travel speed and the acceleration of the robotic arm as a function of the type of the parcel as detected by the first vision system.

5. The equipment for automatically feeding parcels to a sorting conveyor according to claim 4, wherein the processor unit is designed to increase the travel speed of the robotic arm and to increase the suction of the suction cups for small cardboard parcels and to decrease the travel speed for large parcels of the polybag type.

6. The equipment for automatically feeding parcels to a sorting conveyor according to claim 1, wherein the turning is automatic as soon as a parcel is received.

7. The equipment for automatically feeding parcels to a sorting conveyor according to claim 2, wherein the processor unit is provided with a setting for controlling the travel speed and the acceleration of the robotic arm as a function of the type of the parcel as detected by the first vision system.

8. The equipment for automatically feeding parcels to a sorting conveyor according to claim 1, wherein the processor unit is provided with a setting for controlling the travel speed and the acceleration of the robotic arm as a function of the type of the parcel as detected by the first vision system.

9. The equipment for automatically feeding parcels to a sorting conveyor according to claim 7, wherein the processor unit is designed to increase the travel speed of the robotic arm and to increase the suction of the suction cups for small cardboard parcels and to decrease the travel speed for large parcels of the polybag type.

10. The equipment for automatically feeding parcels to a sorting conveyor according to claim 8, wherein the processor unit is designed to increase the travel speed of the robotic arm and to increase the suction of the suction cups for small cardboard parcels and to decrease the travel speed for large parcels of the polybag type.

* * * * *